US012626127B2

(12) United States Patent
Taheri et al.

(10) Patent No.: US 12,626,127 B2
(45) Date of Patent: May 12, 2026

(54) HIGH DIMENSIONAL DENSE TENSOR REPRESENTATION FOR LOG DATA

(71) Applicant: VIAVI Solutions Inc., Chandler, AZ (US)

(72) Inventors: Sayed Taheri, Cheshire (GB); Faris Muhammad, Edgware (GB); Hamed Al-Raweshidy, New Denham (GB); Srini Challa, Hatfield (GB)

(73) Assignee: VIAVI Solutions Inc., Chandler, AZ (US)

( * ) Notice: Subject to any disclaimer, the term of this patent is extended or adjusted under 35 U.S.C. 154(b) by 989 days.

(21) Appl. No.: 17/852,105

(22) Filed: Jun. 28, 2022

(65) Prior Publication Data

US 2023/0419104 A1 Dec. 28, 2023

(51) Int. Cl.
| | |
|---|---|
| *G06N 3/08* | (2023.01) |
| *G06F 18/214* | (2023.01) |
| *G06F 18/22* | (2023.01) |
| *G06F 40/284* | (2020.01) |
| *G06N 3/04* | (2023.01) |
| *G06N 3/063* | (2023.01) |

(52) U.S. Cl.
CPC .............. *G06N 3/08* (2013.01); *G06F 18/214* (2023.01); *G06F 18/22* (2023.01); *G06F 40/284* (2020.01); *G06N 3/04* (2013.01); *G06N 3/063* (2013.01)

(58) Field of Classification Search
None
See application file for complete search history.

(56) References Cited

U.S. PATENT DOCUMENTS

2020/0104639 A1* 4/2020 Didari ...................... G06N 3/08

FOREIGN PATENT DOCUMENTS

WO WO-2022046199 A1 * 3/2022 ............. G06N 3/045

OTHER PUBLICATIONS

Nedelkoski S. Anomaly Detection from System Tracing Data Using Multimodal Deep Learning. 2019 IEEE 12th International Conference on Cloud Computing (Cloud), Jul. 2019. Retrieved from internet <https://ieeexplore.ieee.org/abstract/document/8814585> (Year: 2019).*
Extended European Search Report for Application No. EP23181274.4, mailed Dec. 1, 2023, 8 Pages.
Le, V.H., et al., "Log-based Anomaly Detection Without Log Parsing," Arxiv Org , Aug. 2021, 13 Pages.

* cited by examiner

*Primary Examiner* — Mariela Reyes
(74) *Attorney, Agent, or Firm* — Harrity & Harrity, LLP

(57) ABSTRACT

In some implementations, a device may obtain a training corpus, from a set of pre-processed log data, associated with an alphanumeric format. The device may encode the training corpus to obtain encoded data using a set of tokens. The device may calculate a sequence length based on a statistical parameter associated with the training corpus. The device may generate a set of input sequences and a set of target sequences based on the encoded data, where each input sequence and each target sequence has a length equal to the sequence length. The device may generate a training data set based on combining the set of input sequences and the set of target sequences. The device may train a deep neural network (DNN) using the training data set and based on one or more hyperparameters to obtain a set of embedding tensors associated with an embedding layer of the DNN.

20 Claims, 12 Drawing Sheets

100 ⟶

100

110
Pre-process the raw data to generate pre-processed log data

115
Detect outlier logs from the pre-processed log data based on sizes of the outlier logs 120
Remove the outlier logs from the pre-processed log data 125
Concatenate the pre-processed log data to form a training corpus Data Processing System 105
Software logs identifying raw data Data structure

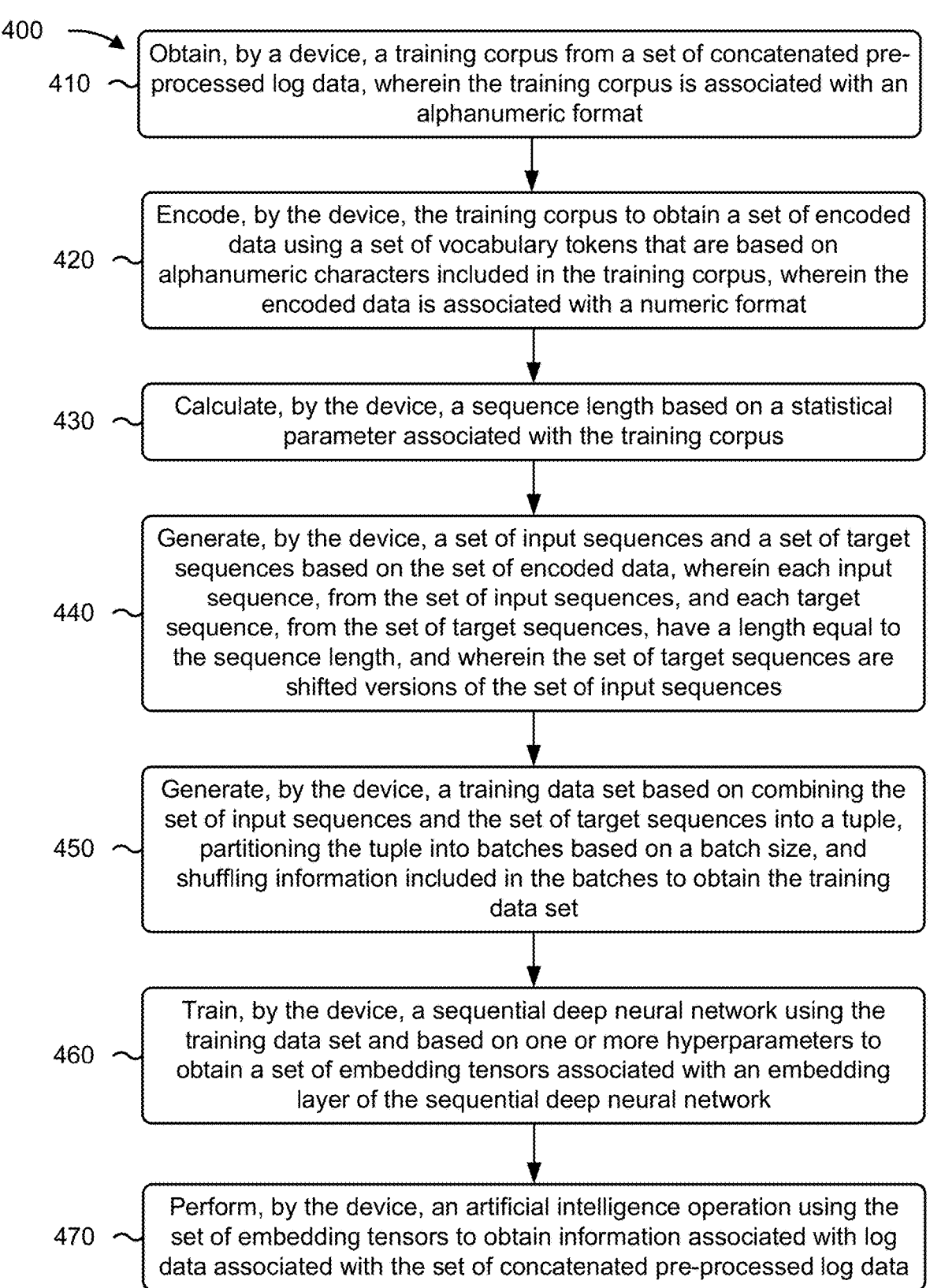

400

410 — Obtain, by a device, a training corpus from a set of concatenated pre-processed log data, wherein the training corpus is associated with an alphanumeric format 420 — Encode, by the device, the training corpus to obtain a set of encoded data using a set of vocabulary tokens that are based on alphanumeric characters included in the training corpus, wherein the encoded data is associated with a numeric format 430 — Calculate, by the device, a sequence length based on a statistical parameter associated with the training corpus 440 — Generate, by the device, a set of input sequences and a set of target sequences based on the set of encoded data, wherein each input sequence, from the set of input sequences, and each target sequence, from the set of target sequences, have a length equal to the sequence length, and wherein the set of target sequences are shifted versions of the set of input sequences 450 — Generate, by the device, a training data set based on combining the set of input sequences and the set of target sequences into a tuple, partitioning the tuple into batches based on a batch size, and shuffling information included in the batches to obtain the training data set 460 — Train, by the device, a sequential deep neural network using the training data set and based on one or more hyperparameters to obtain a set of embedding tensors associated with an embedding layer of the sequential deep neural network 470 — Perform, by the device, an artificial intelligence operation using the set of embedding tensors to obtain information associated with log data associated with the set of concatenated pre-processed log data

FIG. 4

HIGH DIMENSIONAL DENSE TENSOR REPRESENTATION FOR LOG DATA

BACKGROUND

Artificial neural networks, sometime referred to as neural networks (NNs), are computing systems inspired by the biological neural networks associated with a biological brain. An NN is based on a collection of connected units or nodes called artificial neurons, which loosely model the neurons in a biological brain. Each connection, similar to the synapses in a biological brain, can support a transmission of a signal to other neurons. An artificial neuron may receive a signal, processes the signal, and/or transmit the signal to other neurons. The "signal" at a connection is a real number, and the output of each neuron is computed by some non-linear function of the sum of its inputs. The connections may be referred to as edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals may travel from the first layer (the input layer) to the last layer (the output layer) (e.g., possibly after traversing the layers multiple times).

SUMMARY

Some implementations described herein relate to a method. The method may include obtaining, by a device, a training corpus from a set of concatenated pre-processed log data, wherein the training corpus is associated with an alphanumeric format. The method may include encoding, by the device, the training corpus to obtain a set of encoded data using a set of vocabulary tokens that are based on alphanumeric characters included in the training corpus, wherein the encoded data is associated with a numeric format. The method may include calculating, by the device, a sequence length based on a statistical parameter associated with the training corpus. The method may include generating, by the device, a set of input sequences and a set of target sequences based on the set of encoded data, wherein each input sequence, from the set of input sequences, and each target sequence, from the set of target sequences, has a length equal to the sequence length, and wherein the set of target sequences are shifted versions of the set of input sequences. The method may include generating, by the device, a training data set based on combining the set of input sequences and the set of target sequences into a tuple, partitioning the tuple into batches based on a batch size, and shuffling information included in the batches to obtain the training data set. The method may include training, by the device, a sequential deep neural network using the training data set and based on one or more hyperparameters to obtain a set of embedding tensors associated with an embedding layer of the sequential deep neural network. The method may include performing, by the device, an artificial intelligence operation using the set of embedding tensors to obtain information associated with log data associated with the set of concatenated pre-processed log data.

Some implementations described herein relate to a device. The device may include one or more memories and one or more processors coupled to the one or more memories. The one or more processors may be configured to obtain a training corpus from a set of log data, wherein the training corpus includes alphanumeric characters. The one or more processors may be configured to encode the training corpus to obtain a set of encoded data using vocabulary tokens that are based on unique characters included in the alphanumeric characters of the training corpus, wherein the encoded data is associated with a numeric format. The one or more processors may be configured to calculate a sequence length based on a statistical parameter associated with the training corpus. The one or more processors may be configured to generate a set of input sequences and a set of target sequences based on the set of encoded data, wherein each input sequence, from the set of input sequences, and each target sequence, from the set of target sequences, has a length equal to the sequence length. The one or more processors may be configured to generate a training data set based on combining the set of input sequences and the set of target sequences, and shuffling data included in the combined set of input sequences and set of target sequences to obtain the training data set. The one or more processors may be configured to train a deep neural network using the training data set and based on one or more hyperparameters to obtain a set of embedding tensors associated with an embedding layer of the deep neural network, wherein the deep neural network includes the embedding layer, a recurrent neural network layer, and a dense neural network layer. The one or more processors may be configured to perform an artificial intelligence operation using the set of embedding tensors to obtain information associated with the set of log data.

Some implementations described herein relate to a non-transitory computer-readable medium that stores a set of instructions for a device. The set of instructions, when executed by one or more processors of the device, may cause the device to detect one or more outlier data sets from pre-processed log data and remove the one or more outlier data sets from the pre-processed log data. The set of instructions, when executed by one or more processors of the device, may cause the device to obtain a training corpus based on concatenating the pre-processed log data, wherein the training corpus includes alphanumeric characters. The set of instructions, when executed by one or more processors of the device, may cause the device to encode the training corpus to obtain a set of encoded data using a set of vocabulary tokens that are based on unique characters included in the alphanumeric characters, wherein the encoded data is associated with a numeric format. The set of instructions, when executed by one or more processors of the device, may cause the device to calculate a sequence length based on a statistical parameter associated with the training corpus. The set of instructions, when executed by one or more processors of the device, may cause the device to generate a set of input sequences and a set of target sequences based on the set of encoded data, wherein each input sequence, from the set of input sequences, and each target sequence, from the set of target sequences, have a length equal to the sequence length. The set of instructions, when executed by one or more processors of the device, may cause the device to generate a training data set based on combining the set of input sequences and the set of target sequences into a tuple, partitioning the tuple into batches based on a batch size, and shuffling information included in the batches to obtain the training data set. The set of instructions, when executed by one or more processors of the device, may cause the device to train a sequential deep neural network using the training data set and based on one or more hyperparameters to obtain a set of embedding tensors associated with an embedding layer of the sequential deep neural network, wherein the set of embedding tensors is a numerical representation of the pre-processed log data.

BRIEF DESCRIPTION OF THE DRAWINGS

FIG. 4 is a flowchart of an example process relating to high dimensional dense tensor representation for log data.

DETAILED DESCRIPTION

Figure 1A:
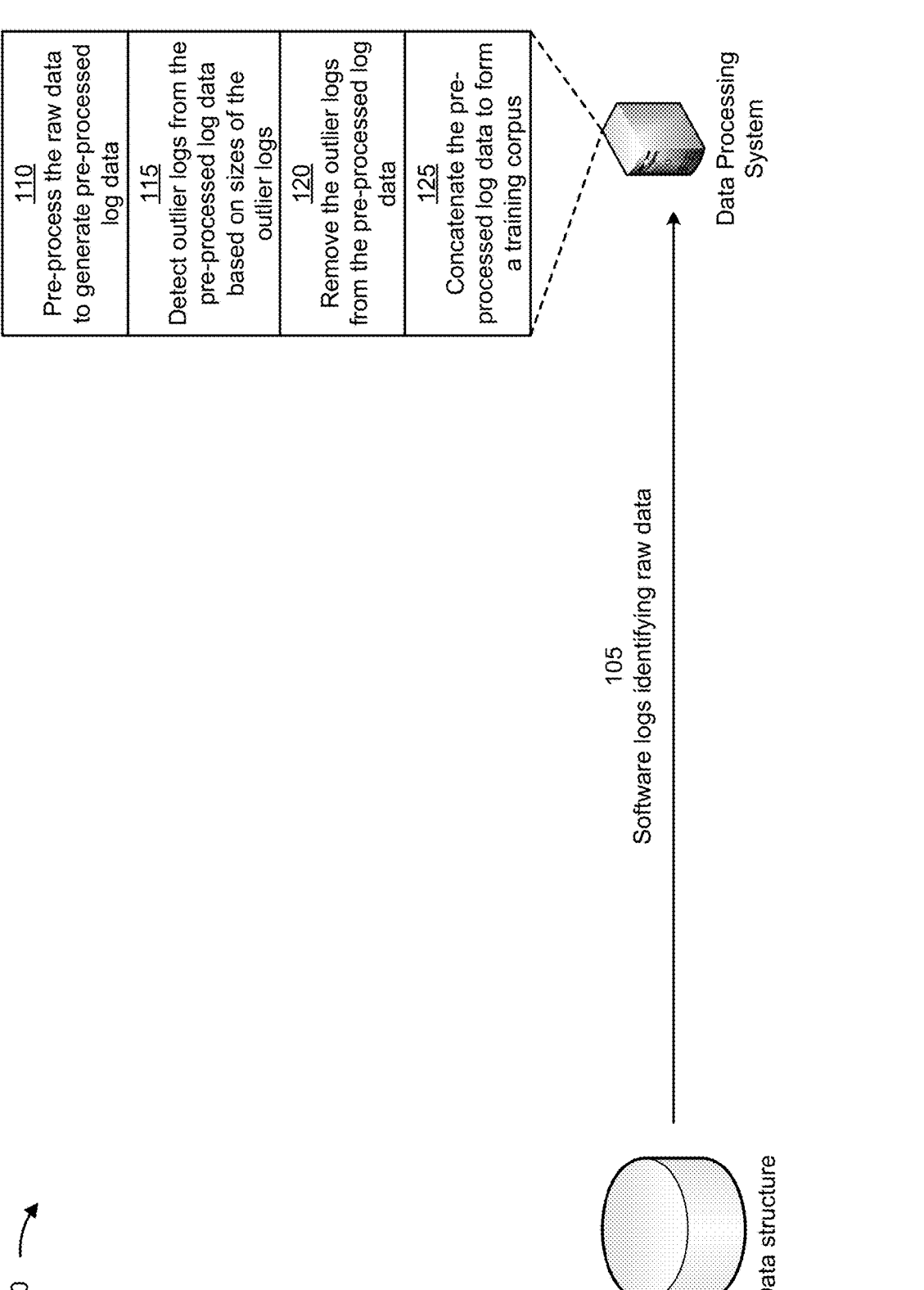
FIGS. 1A-1I are diagrams of an example implementation described herein.

The following detailed description of example implementations refers to the accompanying drawings. The same reference numbers in different drawings may identify the same or similar elements.

Network and/or system testing solutions play a vital role in the development and implementation of new technologies before such technologies can be used by the wider public. Testing of a network and/or system generates large quantities of software logs that include significant amounts of information associated with network or system states, network or system responses, network or system status, interactions with the network or system, runtime information, and/or performance of the network or system, among other examples. As an example, 5G or 6G (or other radio access technologies) telecommunications network testing solutions may generate software logs associated with information collected from performing tests on the network.

The software logs may include millions of lines of coded and uncoded text that is not readily understandable by unskilled people. There are experts at certain institutions that rely on extensive knowledge and experience to interpret the software logs. A log mining process is utilized for failure discovery and diagnosis, security, classification, and/or prediction, among other examples, based on the software logs. The software logs are also a source of diagnosis when malfunctions occur. When a malfunction occurs, experts may analyze the software logs to diagnosis a cause of the malfunction.

The current techniques for analyzing software logs are non-systematic, inefficient, and result in shortcomings and bottlenecks. Not only do the current techniques require allocation and consumption of a large quantity of resources on a repeated basis, but the current techniques also fail to utilize valuable historical data from past resolved cases. Therefore, current techniques for analyzing software logs consume computing resources (e.g., processing resources, memory resources, and/or communication resources), and/or networking resources, among other examples, associated with incorrectly analyzing the software logs, making incorrect modifications to the network or system based on the incorrectly analyzed software logs, and/or correcting the incorrect modifications to the network or system, among other examples.

In some cases, a machine learning model or an artificial intelligence (AI) model may be utilized to extract or obtain information from the software logs. However, machine learning or AI models require inputs to be in a purely numeric format (e.g., the machine learning or AI models may run using numbers or numerical data as inputs). The software logs generated from testing, as described above, may be in a text-type format including alphanumeric characters (e.g., letters, numbers, symbols, and/or other characters). Therefore, the software logs need to be converted from the text-type format (e.g., an alphanumeric format) to a numeric format in order to be analyzed by a machine learning model or an AI model. A success rate of a conversion from a text-type format (e.g., an alphanumeric format) to a numeric format is dependent on the efficiency of the transition from a text space to a numerical space and retaining meaningful information after the conversion. Current techniques, such as natural language processing (NLP), are designed for the different contexts and/or languages and have unequal and often completely distinct structures and characteristics depending on the context or language being converted to the numerical space. However, the software logs do not have traditional structures, languages, words, and/or other structures that may be expected with typical text-type formats (e.g., that may be associated with spoken languages). As a result, current techniques, such as NLP, may fail to maintain meaningful information or patterns in the software logs when converting the software logs to the numerical space. This may cause machine learning or AI operations that are performed using the converted numerical data to produce incorrect, irrelevant, inaccurate, and/or misleading outputs, among other examples.

Some implementations described herein enable high dimensional dense tensor representation for log data (e.g., for software log data). For example, a data processing system may obtain a training corpus from a set of concatenated pre-processed log data (e.g., a set of pre-processed software logs) having an alphanumeric format (e.g., a text-type format). In some implementations, the data processing may detect and remove outlier data sets (e.g., outlier log files) from the set of pre-processed software logs based on a size (e.g., a quantity of lines) associated with the outlier data sets. The data processing system may encode the training corpus to obtain a set of encoded data using a set of vocabulary tokens that are based on the alphanumeric characters included in the training corpus. The encoded data may have a numeric format. The data processing system may calculate a sequence length based on a statistical parameter associated with the training corpus. For example, the sequence length may be used to determine a length or size of input sequences to be used to train a deep neural network (DNN), as described in more detail elsewhere herein. The sequence length may be adaptive or dynamic and may change based on the data included in the software logs.

The data processing system may generate a set of input sequences and a set of target sequences based on the set of encoded data. Each input sequence, from the set of input sequences, and each target sequence, from the set of target sequences, may have a length equal to the sequence length. The data processing system may generate a training data set based on combining the set of input sequences and the set of target sequences into a tuple, partitioning the tuple into batches based on a batch size, and shuffling information included in the batches to obtain the training data set. Shuffling the information may decrease a likelihood of overfitting when training the DNN. The data processing system may train a sequential DNN using the training data set and based on one or more hyperparameters to obtain a set of embedding tensors associated with an embedding layer of the sequential DNN. The data processing system may perform an artificial intelligence operation using the set of embedding tensors to obtain information associated with software log data associated with the set of concatenated pre-processed log data.

As a result, the data processing system may transform text data (e.g., included in the software logs) into numerical data in a manner designed for the complex and sophisticated software logs. The data processing system may convert the text data into dense high dimensional tensors (e.g., the embedding tensors), where each dimension in the tensor space represents a feature extracted from the text data. Therefore, the features of the text data may be extracted without any human input defining the features. The implementations described herein provide an efficient, scalable, and adjustable technique for converting text data included in complex and sophisticated software logs into numeric data while maintaining all features (e.g., meaningful information) of the text data. A machine learning model or an AI model may be trained using the high dimensional tensors (e.g., the embedding tensors) to obtain information associated with the software logs. For example, the machine learning model or an AI model may be trained to classify a software log or to find similar software logs based on the high dimensional tensors (e.g., the embedding tensors). As a result, meaningful information (e.g., a classification or a similarity analysis) may be obtained for a software log without requiring the information in the software log to be analyzed or interpreted (e.g., by a user or a device). This conserves significant time associated with analyzing the software logs. Additionally, this conserves computing resources, and/or networking resources, among other examples that would otherwise have been consumed in analyzing the software logs, making incorrect modifications to a network or system based on incorrectly analyzed software logs, and/or correcting the incorrect modifications to the network or system, among other examples.

FIGS. 1A-1I are diagrams of an example implementation 100 associated with high dimensional dense tensor representation for log data. As shown in FIGS. 1A-1I, example implementation 100 includes a data processing system, and a data structure. The data structure may include a database, a table, and/or a list, among other examples, that stores software logs. These devices are described in more detail below in connection with FIG. 2 and FIG. 3.

As shown in FIG. 1A, and by reference number 105, the data processing system may receive software logs identifying raw data. The software logs may be generated by a system or a network (e.g., a telecommunications network), among other examples. For example, a testing system may perform tests on components of a telecommunications network. The testing of the telecommunications network generates large quantities of software logs that include significant amounts of raw data associated with network states, network responses, network status, interactions with the network, runtime information, and/or performance of the network, among other examples. The software logs may include millions of lines of coded and uncoded text that is not readily understandable by unskilled people. The software logs may include historical test cases as well as resolved and reported cases. Each entry within the software logs may include static fields and dynamic fields, often in free-form natural language text that cannot be readily understood. The static fields may include text that is not variable, remains unchanged during an occurrence of an event, and is related to an event type. The dynamic fields may include text that is variable, that differs from one case to another case, and may be assigned at run-time. A system configuration set by the service provider may determine a form and content of each software log entry associated with a logged event. Although examples may be described herein in connection with telecommunications software logs, it should be understood that the techniques and implementations described herein may be similarly applied to software logs generated by other systems or networks, such as a data center system, a network routing system, or any other system or network.

The testing system and/or the telecommunications network may store the software logs in the data structure. In some implementations, the data structure may be maintained and/or managed by a service provider associated with the telecommunications network. The data processing system may provide or transmit, to the data structure, a request for the software logs and may receive the software logs from the data structure based on the request. In some implementations, the data processing system may receive a path identifying a location of the software logs at initialization. The data processing system retrieve the software logs from the identified path and may process the software logs. The software logs may be in a text-type format (e.g., may be in a .txt format). For example, the software logs may include alphanumeric characters and/or other characters or symbols.

As shown by reference number 110, the data processing system may pre-process the raw data included in the software logs to obtain a set of pre-processed log data. For example, the data processing system may convert the raw data from a markup language format to a text format, to generate text data. For example, the raw data may be provided in a markup language format, such as hypertext markup language (HTML) format. The data processing system may convert the raw data from the markup language format to the text format (e.g., the text data) for further processing. The raw data may be converted or transformed into the text data, which is unified clean data that is compatible with a DNN model. The data processing system may not perform processing on the actual raw data. The data processing system may read the raw data from the data structure, may process the raw data, and may write new clean data to a data structure associated with the data processing system. In this way, the data processing system may ensure that the valuable actual raw data is still available for any future purposes.

In some implementations, the static fields, the dynamic fields, and elements of each within the software logs may be separated by a variety of delimiters, such as semicolons, commas, brackets, white space, next lines, and/or the like. The data processing system may eliminate the delimiters from the software logs so that the clean data may be processed by the DNN model. If the delimiters are not removed or replaced, performance of the DNN model may be reduced. Furthermore, if the delimiters are not removed, allocation of labelled data for training the DNN model may be much more challenging and less effective. The data processing system may perform one or more other preprocessing operations, such as: changing name strings of the text data to a new name; extracting pre-log data, associated with test cases, from the text data; removing files with less than a threshold quantity of lines from the text data to generate modified text data; extracting user equipment (UE) data, associated with a particular quantity of UEs, from the modified text data; decoding radio resource control (RRC) messages in the modified text data to generate decoded RRC messages; extracting marker data, associated with particular markers, from the modified text data; removing files associated with timestamps and a first set of the test cases from the modified text data to generate further modified text data; extracting test case data, associated with a second set of the test cases, from the further modified text data; and/or removing, from the further modified text data, lines that include particular syntax (e.g., "python.exe," syntax indicating that a test executed and passed, syntax indicating that an action is waiting to be performed); among other examples.

The output of the pre-processing operation(s) may include a data structure with a file name identifier column, a verdict column, and/or a quantity of UEs column, among other examples. The verdict column may include entries for binary values (e.g., "1" for Pass or "0" for Fail) indicating whether a software log was associated with a pass test case or a failure test case (e.g., "PASS: The test ran successfully and passed" or "FAIL: The test ran to completion, test conditions not met"). The quantity of UEs columns may include entries that associate the quantity of UEs data for validation purposes. For example, if an objective is to extract single UE cases and perform the pre-processing tasks on the single UEs, the quantity of UEs column may include a value of one.

As shown by reference number 115, the data processing system may detect and remove one or more outlier data sets (e.g., one or more files) from pre-processed log data. For example, the data processing system may detect the one or more outlier data sets (e.g., one or more files) from pre-processed log data based on a length or a size of the one or more outlier data sets. In other words, the data processing system may detect one or more data sets (e.g., one or more files) that are outliers in terms of size as compared to the rest of the pre-processed log data. The data processing system may detect the one or more outlier data sets (e.g., one or more files) from pre-processed log data using an inter-quartile range (IQR) technique, and/or a standard deviation technique, among other examples. For example, the data processing system may identify data sets, from the pre-processed log data, having a size that is outside of a threshold range (e.g., the $25^{th}$ to $75^{th}$ percentile of the size of the pre-processed log data).

For example, an IQR technique may include detecting the $25^{th}$ percentile and the $75^{th}$ percentile of the pre-processed log data (e.g., in terms of size). This may be represented via a box and whisker plot. The data processing system may detect data sets (e.g., files) having a size that is in a percentile less than the $25^{th}$ percentile of the pre-processed log data. Similarly, the data processing system may detect data sets (e.g., files) having a size that is in a percentile greater than the $75^{th}$ percentile of the pre-processed log data. As shown by reference number 120, the data processing system may identify such data sets (e.g., files) as outliers and may remove the outlier data sets from the set of pre-processed log data. This may reduce training time for a DNN (e.g., as explained in more detail elsewhere herein). Additionally, this may reduce a likelihood of overfitting or incorrect training that may result from using pre-processed log data having an unusually small or large size, thereby improving a performance of the training of the DNN by removing such outlier data sets.

As shown by reference number 125, the data processing system may concatenate (e.g., combine or link together) the pre-processed log data (e.g., after removing the outlier data sets) to obtain a set of concatenated pre-processed log data. The set of concatenated pre-processed log data may form a training corpus for the DNN. Similar to the software logs containing the raw data, the training corpus may be associated with an alphanumeric format, such as a text-type format. For example, the training corpus may be a file (or multiple files) having a .txt format.

Figure 1B:
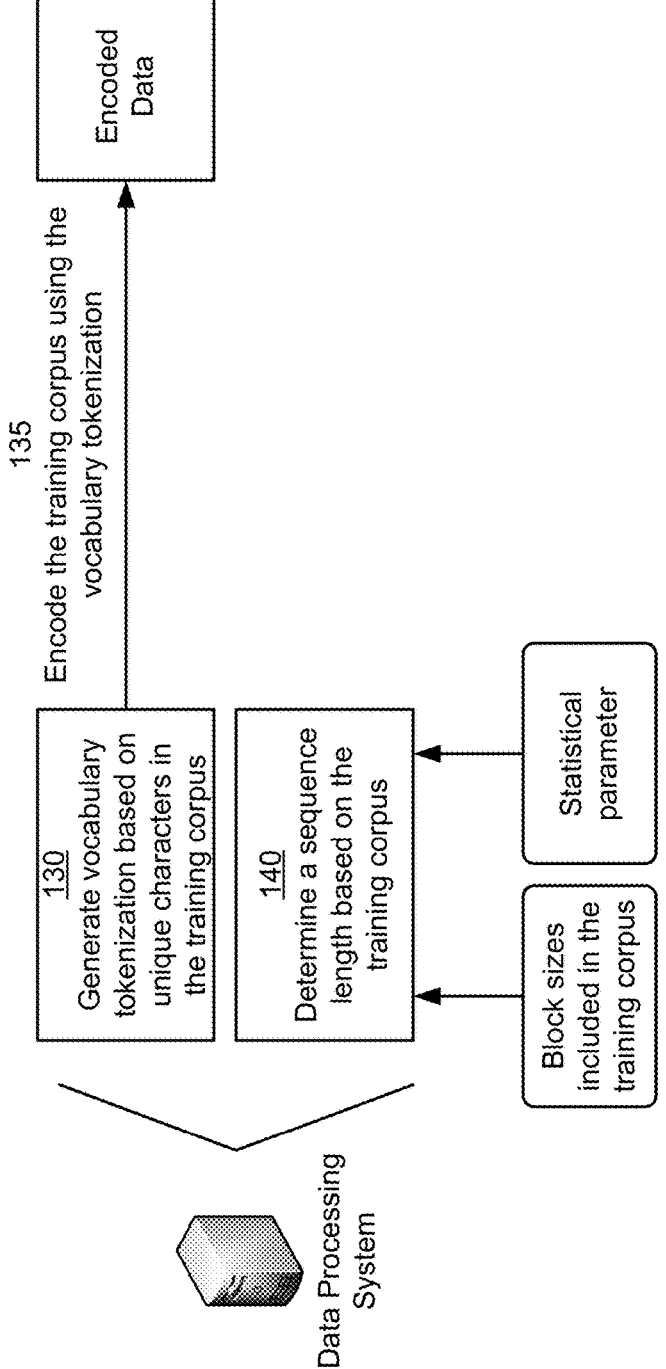

As shown in FIG. 1B, the data processing system may perform an encoding operation for the set of concatenated pre-processed log data. For example, as shown by reference number 130, the data processing system may generate a set of vocabulary tokens that are based on alphanumeric characters included in the training corpus. For example, the data processing system may perform a tokenization of the training corpus. The data processing system may scan and/or analyze the training corpus to identify tokens (e.g., vocabulary tokens). For example, the tokens (e.g., vocabulary tokens) may be unique character included in the training corpus. As used herein, "unique characters" may refer to each character (e.g., letter, number, symbol, or other character) that appears in the training corpus at least once.

For example, the data processing system may scan the entire training corpus to identify characters that appear in the training corpus at least once. Each character that appears in the training corpus at least once (e.g., the unique characters in the training corpus) may form the set of vocabulary tokens. Using the unique characters in the training corpus as the tokens for tokenization of the training corpus may simplify the tokenization operation because the quantity of unique characters included in the training corpus (e.g., in the software logs) may be significantly smaller than other character lists used for tokenization, such as American Standard Code for Information Interchange (ASCII) table of 256 characters (e.g., 8 bits) or an ASCII table of 128 characters (e.g., 7 bits). For example, a quantity of unique characters in the training corpus may be in the range of 90 to 100 characters. Therefore, using the unique characters in the training corpus as the vocabulary tokens may conserve processing resources and/or time associated with encoding or tokenizing the training corpus.

The data processing system may generate an array that can be used to convert between the vocabulary of the training corpus (e.g., the unique characters) and index values (e.g., a numeric space). The array may enable a two-sided system in which the data processing system is enabled to convert or encode the text in the training corpus to a numeric space (e.g., using index values) and to convert the numeric space (e.g., the index values) to an alphanumeric space (e.g., the text).

As shown by reference number 135, the data processing system may encode the training corpus to obtain a set of encoded data. For example, the data processing system may encode the training corpus using the set of vocabulary tokens that are based on alphanumeric characters included in the training corpus (e.g., using the array generated as described above). The data processing system may encode the entire training corpus (e.g., to generate encoded text (ET) of the training corpus). Alternatively, the data processing system may encode a subset of the training corpus. The length or size of the encoded text ($ll_{et}$) of the training corpus may be equal to the length of size of the training corpus ($l_{tc}$).

In some implementations, the data processing system may encode the training corpus to obtain a set of encoded data blocks. In some implementations, the data processing system may detect one or more outlier encoded data blocks from the set of encoded data based on a size of the one or more outlier encoded data blocks. For example, the data processing system may utilize IQR or a standard deviation technique to identify encoded data blocks that have a size that is outside of a threshold range. The data processing system may remove any identified outlier encoded data blocks from the set of encoded data blocks associated with the training corpus.

As shown by reference number 140, the data processing system may calculate or determine a sequence length ($l_s$) based on a statistical parameter associated with the training corpus. The sequence length may be adaptive to the data or information included in the training corpus (e.g., may be based on the data or information included in the training corpus). In this way, the sequence length of sequences that form a training data set for the DNN, as explained in more detail elsewhere herein, may have a length that is adapted to the data or information included in the training corpus. This may reduce, or eliminate, the need for the data processing system to perform techniques to ensure sequences that are input to the DNN all have the same length, such as a zero padding technique, or another technique. This, in turn, conserves processing resources and reduces a complexity associated with training the DNN.

To calculate the sequence length, the data processing system may detect a set of data blocks from the training corpus based on one or more indicators included in the alphanumeric characters included in the training corpus. The indicators may be identifiers, characters, or other symbols that indicate breaks or partitions between meaningful information in the software logs. For example, the one or more indicators may be command indicators. For example, in a telecommunications software log, the blocks may be text or information included between indications and confirmations as indicated by the software log (e.g., the software log may include "I:" to show an indication starting an input or test information and a "C:" to indicate a confirmation of the end of meaningful information). A block may be detected as the information or text between the "I:" and the "C:" included in the training corpus. The data processing system may determine a size or length of each data block included in the set of data blocks. In some implementations, the data processing system may remove any data blocks, from the set of data blocks, that are associated with an outlier length (e.g., identified using IQR or another technique in a similar manner as described in more detail elsewhere herein). The data processing system may calculate a statistical parameter based on sizes of data blocks included in the set of data blocks to obtain the sequence length. In this way, the sequence length may be adapted to a size of blocks of meaningful information included in the training corpus. The sequence length may be used to generate a set of training sequences for the DNN (e.g., from the encoded text of the training corpus). This may improve a performance of the training of the DNN (e.g., as compared to using a fixed value as the sequence length) because the training sequences have lengths or sizes that are adapted to the information included in the training corpus.

For example, the data processing system may calculate the sequence length according to the following equation:

$$l_s = \sum\nolimits_{i=1}^{n_B - n_o} \frac{|B_i|}{n_B - n_o}$$

where $l_s$ is the sequence length, $n_B$ is the quantity of detected blocks $B_i$, and $n_o$ is the quantity of outlier blocks. For example, the data processing system may detect $n_B$ blocks $B_i$ in the training corpus. The data processing system may calculate a length or size, $|B_i|$, of each detected block for $i=1$ to $i=n_B$. The data processing system may detect $n_o$ outlier blocks based on the calculated lengths or sizes (e.g., using IQR or another technique). The data processing system may remove the $n_o$ outlier blocks from the set of data blocks. The data processing system may calculate $l_s$ using the equation above. In the equation above, the statistical parameter used to calculate the sequence length $l_s$ is an average of the lengths or sizes of the detected blocks (e.g., with outlier blocks removed). In some other implementations, a different statistical parameter may be used to calculate the sequence length, such as a median length or size of the detected blocks, a mode of the length or size of the detected blocks, and/or a weighted average of the length or size of the detected blocks (e.g., where certain blocks have a different weight applied to the length or size when calculating the average), among other examples. The data processing system may determine a total quantity of training sequences, ISI, based on a length of the encoded text of the training corpus dived by the calculated sequence length.

Figure 1C:
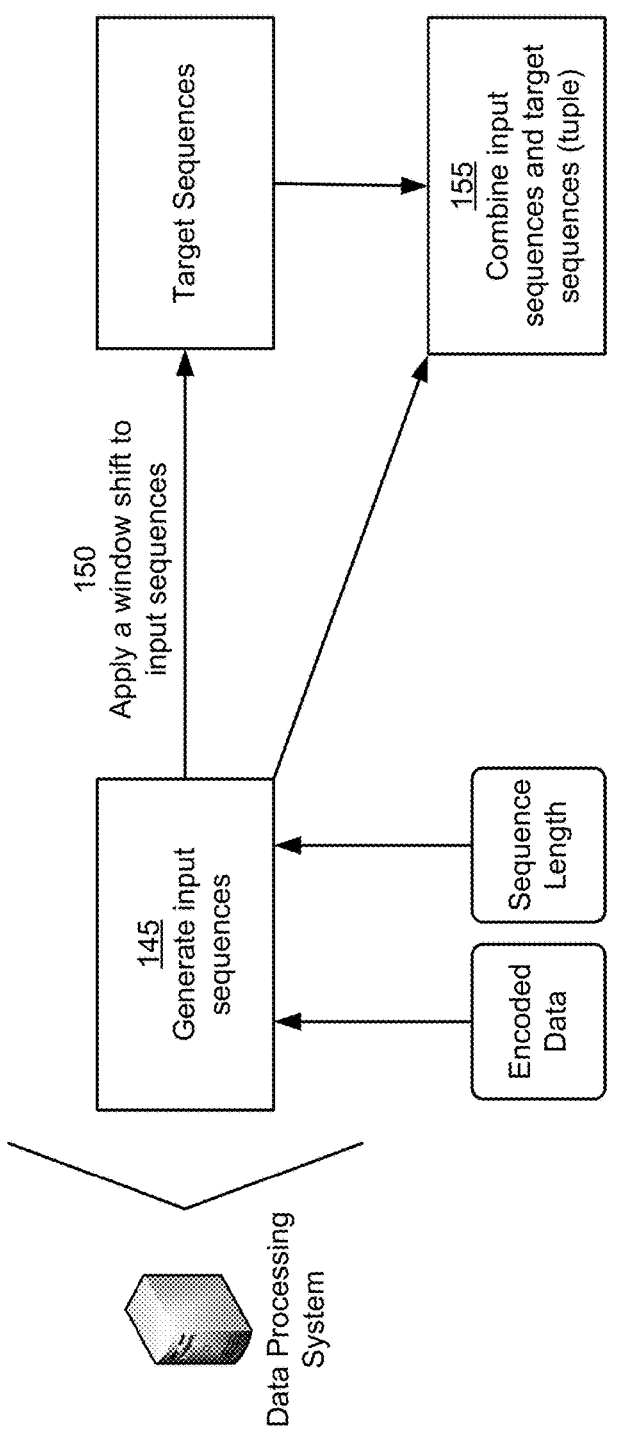

As shown in FIG. 1C, the data processing system may generate training sequences (e.g., a set of training data) for the DNN based on the encoded data (e.g., the encoded text of the training corpus). For example, as shown by reference number 145, the data processing system may generate a set of input sequences. For example, based on one or more tensor slices and the encoded data (e.g., the encoded text) from the training corpus, the data processing system may generate the set of input sequences. The one or more tensor slices may be generated based on an open-source program, such as the program tf.data.Dataset.from_tensor_slices from the open-source platform TENSORFLOW, among other examples. For example, the data processing system may generate input sequences $s_i \in S_i$, where $i \in 1$: ISI. Each input sequence may have a length equal to the sequence length $l_s$ (e.g., calculated as described above). In other words, the data processing system may partition the encoded data (e.g., the encoded text of the training corpus) into ISI input sequences, each input sequence having a length $l_s$.

As shown by reference number 150, the data processing system may apply a window shift (e.g., a time step) $l_w$ to the input sequences to generate a set of target sequences. The unit of length (e.g., a shift value) of the window shift (e.g., $l_w$) may be in terms of a quantity of characters. In some implementations, the unit of length (e.g., a shift value) of the window shift (e.g., $l_w$) may have a value of 1 (one). Based on applying the window shift to the set of input sequences, the data processing system may obtain a set of target sequences $s_t \in S_t$, where $t \in 1$: ISI. Therefore, the set of target sequences may be shifted versions of the set of input sequences.

Each target sequence may have a length equal to the sequence length $l_s$ (e.g., calculated as described above). The input sequences and the target sequences may each have the same size (e.g., the sequence length $l_s$). In some implementations, for each input sequence, there may be one corresponding target sequence.

As shown by reference number 155, the data processing system may combine the set of input sequences and the set of target sequences (e.g., into a tuple). Because the set of input sequences and the set of target sequences each have the same length (e.g., $l_s$), the data processing system may not be required to perform one or more operations to ensure the set of input sequences and the set of target sequences have the same length when combining the set of input sequences and the set of target sequences to form the tuple. For example, if some input sequences or target sequences were different lengths or sizes, the data processing system may need to perform one or more operations, such as a zero padding operation, to ensure the sequences are all the same length or size. Therefore, by ensuring that the set of input sequences and the set of target sequences each have the same length (e.g., $l_s$), the data processing system may reduce a complexity and/or conserve processing resources associated with generating the training sequences for the DNN.

Figure 1D:
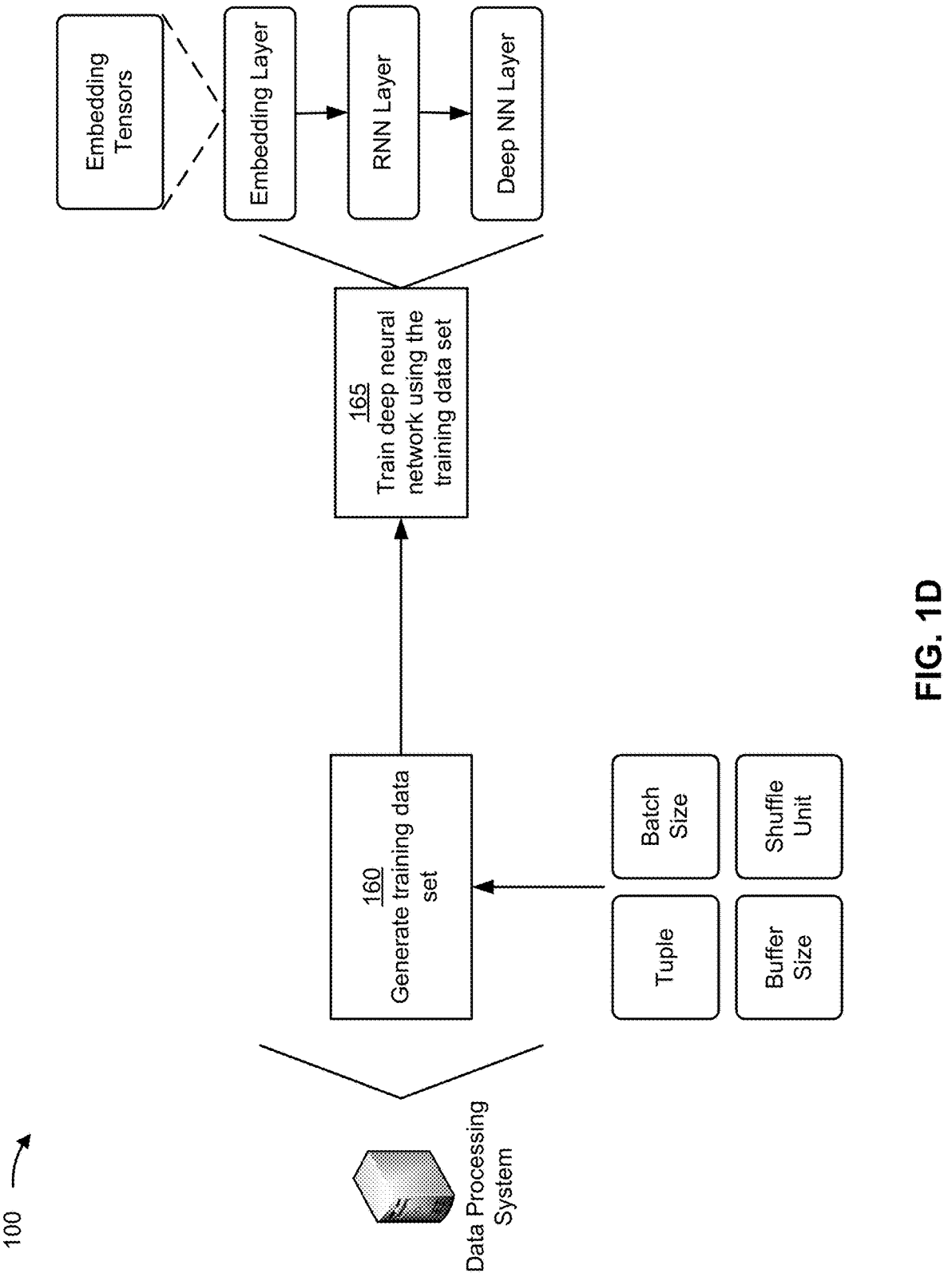

As shown in FIG. 1D, and by reference number 160, the data processing system may generate a training data set for the DNN. For example, the data processing system may generate the training data set (e.g., a set of training sequences) based on the tuple (e.g., the combined set of input sequences and set of target sequences). Additionally, the data processing system may generate the training data set based on a batch size |b|. The batch size may indicate a size of one or more batches for training the DNN. For example, for a batch size |b|, the data processing system may need to pass through |S|/|b| training sets for a single epoch to be completed. An epoch may refer to a single pass through an entire training data set when training a machine learning model, such as the DNN. In some implementations, the data processing system may generate the training data set based on a buffer size (e.g., an amount of memory that can be stored, associated with the training data set, for training the DNN). For example, the data processing system may generate the training data set to ensure that a size of the training data set, or a size of a given batch associated with the training data set, does not exceed the buffer size.

The data processing system may partition the tuple (e.g., including the set of input sequences and the set of target sequences) into one or more batches based on the batch size |b|. Additionally, the data processing system may shuffle data included in each batch based on a shuffle unit. For example, the data processing system may run each batch through a shuffle unit or a randomizer to shuffle the data included in each batch. This may reduce a likelihood of overfitting when training the DNN (e.g., ensure that the DNN does not "overfit" to one specific section of the data included in the training corpus). Based on shuffling information included in the batches, the data processing system may obtain the training data set, which may also be referred to herein as shuffled data tensors (SDT). A shuffled data tensor may have a size of $((|b|, l_s), (|b|, l_s))$.

As shown by reference number 165, the training data set (e.g., the SDT) may be used to train the DNN. As described elsewhere herein, the DNN may be a sequential DNN. The data processing system may train the sequential DNN using the training data set and based on one or more hyperparameters to obtain a set of embedding tensors associated with an embedding layer of the sequential DNN. The one or more hyperparameters may include a quantity of epochs associated with training the DNN, a size associated with the set of vocabulary tokens (|V|), the batch size (|b|), an embedding dimension size ($d_E$), and/or a quantity of neurons or hidden units associated with a recurrent neural network (RNN) layer of the sequential DNN ($n_u$), among other examples. In some implementations, the data processing system may receive a user input indicating values for one or more of the hyperparameters. For example, the data processing system may receive an indication of respective values for the one or more hyperparameters. Additionally, or alternatively, the data processing system may determine values for one or more of the hyperparameters.

As shown in FIG. 1D (and FIG. 1I), the DNN may include an embedding layer as a first layer (e.g., an input later), an RNN layer as a second layer, and a dense NN layer as a third layer (e.g., an output layer). The embedding dimension size ($d_E$) may define a quantity of features that the DNN may capture and compute automatically (e.g., features of the software logs). A large value for $d_E$ may result in a large tensor space which may cause overfitting and increase processing resources required for training. A small value for $d_E$ may result in a small-scale and poor tensor space, which typically induces bias as a result of a simplistic representation of the features of the software logs. Therefore, the value for $d_E$ may be selected to balance between the two extremes described above. In some implementations, the value for $d_E$ may be between 50 and 125, or more specifically, between 64 and 100. The input hyperparameters for the embedding layer may be the size associated with the set of vocabulary tokens, the batch size, and/or the embedding dimension size (e.g., may be ($|V|$, $|b|$, $d_E$)), among other examples.

Following the embedding layer, an RNN layer may be added to the DNN. The RNN may be a long short-term memory (LSTM) RNN layer or a gated recurrent unit (GRU) RNN layer, among other examples. The type of RNN layer (e.g., LSTM or GRU, among other examples) may be another hyperparameter associated with the DNN. The RNN network layer may be associated with input hyperparameters, from the one or more hyperparameters, including a quantity of neurons (e.g., artificial neurons) or hidden units (n u), and a recurrent initializer, among other examples. The quantity of neurons (e.g., artificial neurons) or hidden units (n u) may define a dimension of a vector that is passed from the RNN layer to another layer. Similar to the value for $d_E$, a value of $n_u$ may be selected to balance between overfitting (e.g., when the value of $n_u$ is too large) and not fitting the data sufficiently (e.g., when the value of $n_u$ is too small).

The last layer (e.g., the output layer) of the DNN may be a dense NN. For example, the dense NN may be added to the DNN after the RNN. The dense NN layer may be associated with an input hyperparameter including the size associated with the set of vocabulary tokens (|V|), among other examples. In some implementations, the data processing system may deploy or execute a softmax classifier function to classify between different possible choices within the vocabulary (e.g., the text of the training corpus) each pass through the training process. The data processing system may train the DNN to converge to a solution for the following set of numerical optimization equations for one-sided backward set of sequences (1B-SOS), one-sided forward set of sequences (1F-SOS), and two-sided set of sequences (2-SOS), respectively:

$$\arg_\theta^{min} \frac{1}{|S|} \sum_{i=1}^{|S|} \log p\big(s_i \big| s_{i-n_s}, \ldots, s_{i-1}\big)$$

$$\arg_\theta^{min} \frac{1}{|S|} \sum_{i=1}^{|S|} \log p\big(s_i \big| s_{i+1}, \ldots, s_{i+n_s}\big)$$

$$\arg_\theta^{min} \frac{1}{|S|} \sum_{i=1}^{|S|} \log p\big(s_i \big| s_{i-n_s}, \ldots, s_{i-1}, s_{i+1}, \ldots, s_{i+n_s}\big)$$

where $n_s$ is a quantity of sequence to look backward or forward when training, i is a sequence index, and $\theta$ is a set of the DNN's parameters to be numerically optimized. A value of $n_s$ may be selected as one to simplify the training process. Therefore, the equations about may be rewritten as:

$$\arg_\theta^{min} \frac{1}{|S|} \sum_{i=1}^{|S|} \log p(s_i|s_{i-1})$$

$$\arg_\theta^{min} \frac{1}{|S|} \sum_{i=1}^{|S|} \log p(s_i|s_{i+1})$$

$$\arg_\theta^{min} \frac{1}{|S|} \sum_{i=1}^{|S|} \log p(s_i|s_{i-1}, s_{i+1})$$

The information content $I(s_i)$ of a given sequence $s_i$ may be represented as the negative logarithm of probability $p(s_i)$ or $I(s_i) = -\log_2 p(s_i)$. Therefore, the entropy (H) of all sequences in the training corpus may be defined as the expectation of the information content of all sequences in the set, which may be represented as:

$$H = \sum_{i \in 1:|S|} p(s_i)I(s_i) = -\sum_{i=1}^{|S|} p(s_i) \log_2 p(s_i)$$

The above equations may be used by the DNN to predict the characters in the sequences by computing target probabilities distribution over the entire vocabulary of the training corpus. The optimization problems for converging the DNN may be represented, for one-sided backward set of sequences (1B-SOS), one-sided forward set of sequences (1F-SOS), and two-sided set of sequences (2-SOS), respectively, as:

$$\arg_\theta^{min} \frac{1}{|S|} \sum_{i=1}^{|S|} \sum_{t=1}^{|V|} \log p\left(c_{t+1}^{s_i} \big| c_{t-l_s}^{s_i}, \dots, c_{t-1}^{s_i}, c_t^{s_i}\right)$$

$$\arg_\theta^{min} \frac{1}{|S|} \sum_{i=1}^{|S|} \sum_{t=1}^{|V|} \log p\left(c_t^{s_i} \big| c_{t+1}^{s_i}, \dots, c_{t+l_s}^{s_i}\right)$$

$$\arg_\theta^{min} \frac{1}{|S|} \sum_{i=1}^{|S|} \sum_{t=1}^{|V|} \log p\left(c_t^{s_i} \big| c_{t-l_s}^{s_i}, \dots, c_{t-1}^{s_i}, c_{t+1}^{s_i}, \dots, c_{t+l_s}^{s_i}\right)$$

where $$c_t^{s_i}$$

is a character t in a given sequence $s_i$.

Therefore, using the optimization problems for converging the DNN, the DNN may be trained using the training data set generated by the data processing system, as described above. Based on training and/or converging the DNN, the set of embedding tensors associated with the embedding layer may be obtained by the data processing system. The set of embedding tensors may be weights of the embedding layer applied to hidden units or neurons $n_u$ in the embedding layer. The set of embedding tensors may be a numerical representation of the pre-processed log data (e.g., of the text in the software logs). For example, an embedding tensor may represent a feature of the text in the software logs. By training the DNN to obtain the set of embedding tensors, the data processing system may obtain a numerical representation of the text in the software logs.

Figure 1E:
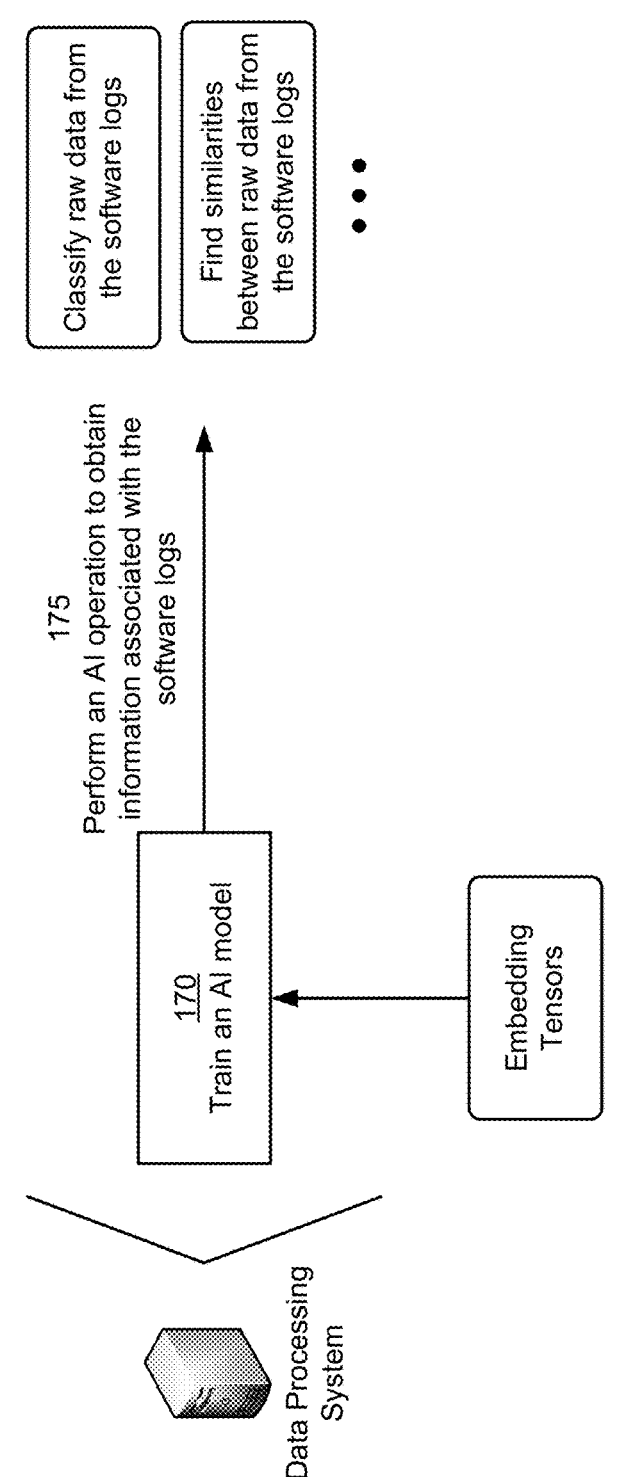

As shown in FIG. 1E, and by reference number 170, the data processing system may train an AI model or a machine learning model based on the set of embedding tensors. For example, the data processing system may train the AI model to identify information associated with the text in the software logs based on the set of embedding tensors. As shown by reference number 175, the data processing system may perform an artificial intelligence operation using the set of embedding tensors to obtain information associated with the software log data. For example, performing the artificial intelligence operation may include classifying, using an artificial intelligence model that is trained based on the set of embedding tensors (e.g., that is trained based on using the set of embedding tensors as an input to the artificial intelligence model), the log data into one or more categories from a set of candidate categories. For example, for telecommunications software logs (e.g., generated by testing machines), the software logs may be classified as being associated with a physical (PHY) layer issue or not being associated with a PHY layer issue. As another example, the AI model may classify a software log into one category from multiple categories (e.g., 2 categories, 3 categories, 5 categories, or a different quantity of categories). As another example, performing the AI operation may include performing a similarity analysis of the set of log data to one or more other sets of log data. For example, based on providing embedding tensors of different software logs, the AI model may find sets of software logs that have a threshold degree of similarity. As another example, based on providing embedding tensors of different software logs, the AI model may categorize or sort sets of software logs based on the similarities of corresponding information contained within the sets of software logs (which may not readily understandable by humans). As a result, by obtaining the embedding tensors as described above, the data processing system may be enabled to obtain a numerical representation of software logs that efficiently and accurately maintains meaningful information or patterns within the software logs.

Figure 1F:
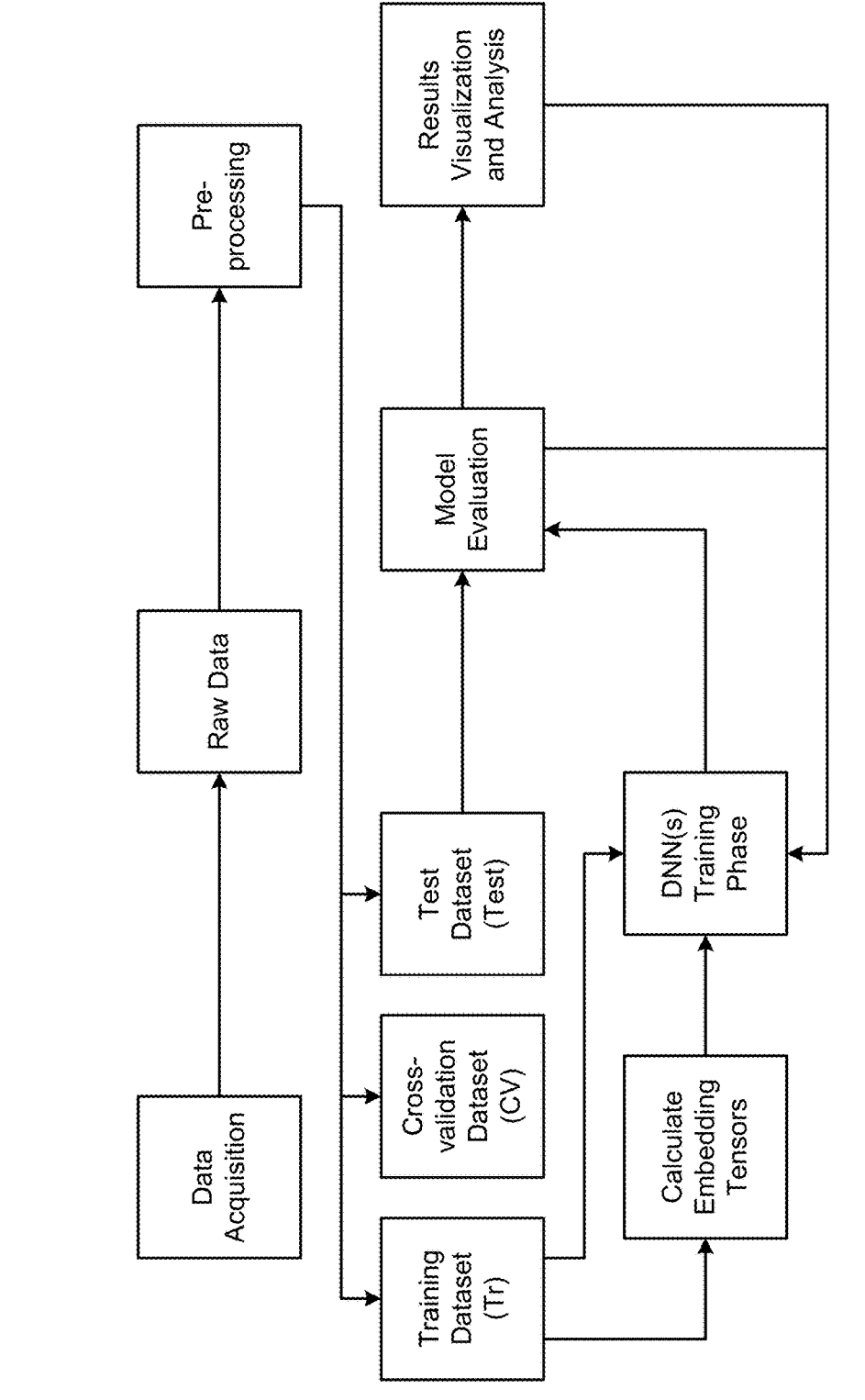

FIG. 1F is a diagram depicting a workflow for generating training data, validation data, and test data for a machine learning model, such as the DNN. As shown, the software logs identifying the raw data may be acquired (e.g., via data acquisition) by the data processing system from the service provider data structure. The data processing system may process the software logs to generate the final data, as described above, and may create a training dataset (Tr), a cross-validation dataset (CV), and a test dataset (Test) based on the final data. The training dataset may be utilized to calculate the embedding tensors from the DNN (e.g., a set of embedding vectors). The embedding tensors and the training dataset may be utilized during a training phase of the DNN model and to generate a trained DNN. The cross-validation dataset and the test dataset may be utilized to evaluate the trained DNN and to generate results and analysis. A visualization of the results and the analysis may be provided for display. The results and the analysis may also be utilized to retrain the trained DNN.

Figure 1G:
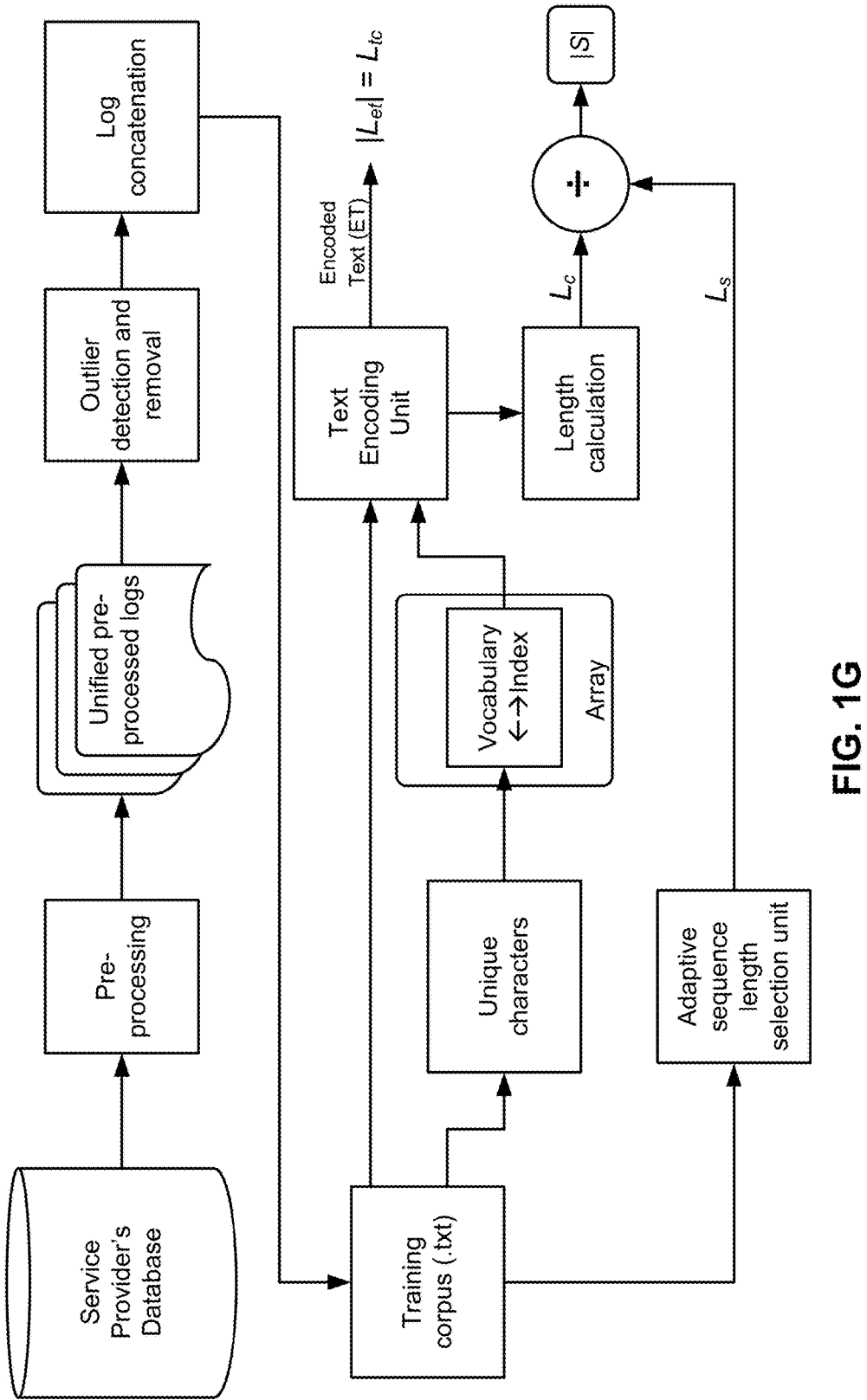

FIG. 1G is a diagram depicting a pipeline of the data processing system for converting raw data from software logs into encoded text. As shown, the software logs identifying the raw data may be collected and/or acquired by the data processing system from the service provider data structure. The data processing system may pre-process the software logs to generate unified pre-processed versions of the software logs, as described in more detail elsewhere herein. The data processing system may detect and remove outliers for the unified pre-processed logs. The data processing system may concatenate the unified pre-processed logs to perform the training corpus (e.g., in a .txt format).

The data processing system may determine tokens (e.g., vocabulary tokens) for the training corpus based on identifying unique characters within the training corpus. An array including a mapping of the unique characters to respective index values may be generated and provided to a text encoding unit of the data processing system. The text encoding unit may encode the training corpus to obtain encoded text (ET), where the encoded text has a length or size equal to the length or size of the training corpus. Additionally, an adaptive sequence length selection unit of the data processing system may calculate the sequence length ($l_s$) based on data included in the training corpus, as described in more detail elsewhere herein. The data processing system may determine a quantity of training sequences |S| to be generated based on dividing a length (or size) of the encoded text ($l_c$) by the sequence length ($l_s$).

Figure 1H:
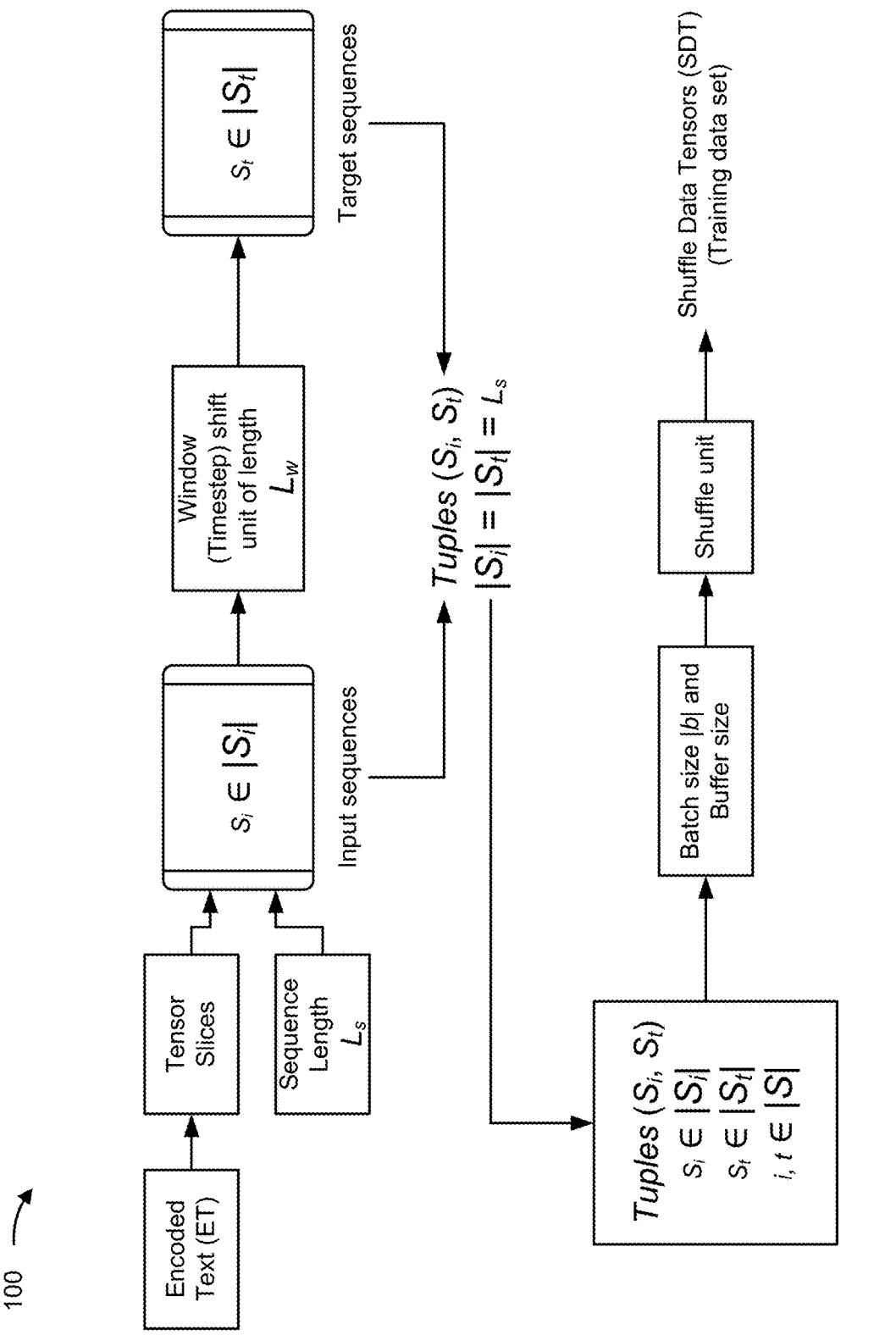

FIG. 1H is a diagram depicting a pipeline of the data processing system for generating a training data set (e.g., SDT) to be used for training the DNN. As shown in FIG. 1H, the data processing system may generate the set of input sequences ($S_i$) based on the encoded text of the training corpus, one or more tensor slices, and the sequence length ($l_s$). The data processing system may generate the set of target sequences ($S_t$) based on applying a window shift to the set of input sequences ($S_i$). Each input sequence and each target sequence may have a length equal to the sequence length ($l_s$). Additionally, i and t may span from 1 to |S|. The data processing system may combine the set of input sequences and the set of target sequences into a tuple. The data processing system may partition the tuple into batches based on the batch size and/or the buffer size. The data processing system may provide the batch(es) to a shuffle unit of the data processing system to shuffle the batch(es) (e.g., to reduce a likelihood of overfitting). The output of the shuffle unit may be the SDT, which may be used as the training data set of the DNN.

Figure 1I:
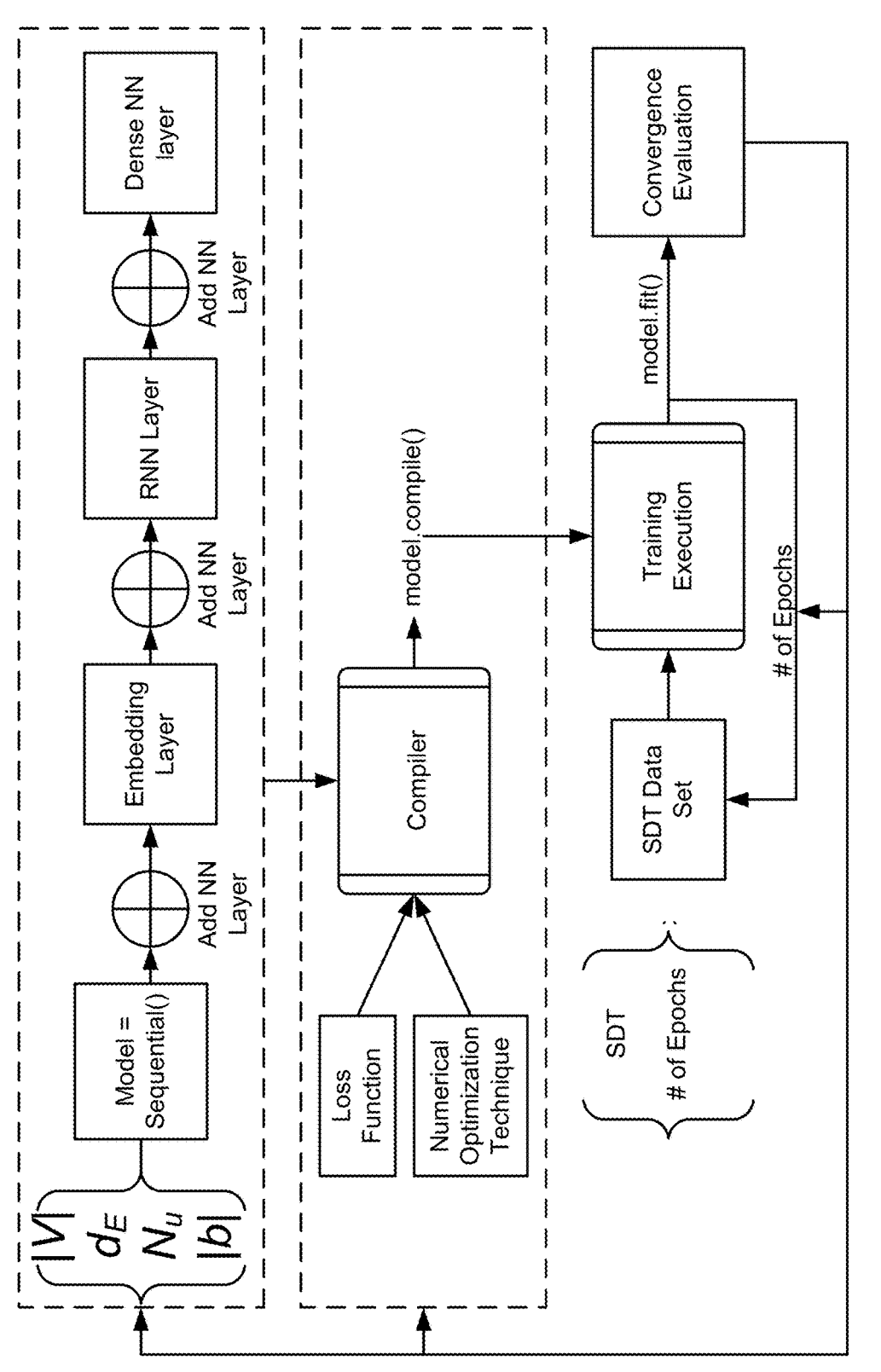

FIG. 1I is a diagram depicting a pipeline of the data processing system for training the DNN to obtain the high dimension embedding tensors that serve as the numerical representation of the software logs. As shown in FIG. 1I, and as described in more detail elsewhere herein, the DNN may include an embedding layer, an RNN layer, and a dense NN layer. Various hyperparameters may be provided as inputs to the different layers, as described above. Once the DNN is compiled, the data processing system may execute training the DNN based on the SDT data set (e.g., the training data set) for a quantity of epochs (e.g., which may be defined by a hyperparameter). The data processing system may evaluate a convergence of the DNN using various mathematical operations or equations, such as the equations described above. Once the DNN is converged and/or trained, the data processing system may obtain the embedding tensors from the embedding layer (e.g., weights applied in the embedding layer by the trained DNN). As described elsewhere herein, the embedding tensors may be numerical data that represents the textual data included in the software logs. The embedding tensors may be used as inputs to other AI models or machine learning models to classify, obtain information regarding, or find similarities between, various software logs (e.g., without performing an analysis or evaluation of the textual data included in the software logs).

As a result, the data processing system may transform text data (e.g., included in the software logs) into numerical data in a manner designed for the complex and sophisticated software logs. The data processing system may convert the text data into dense high dimensional tensors (e.g., the embedding tensors), where each dimension in the tensor space represents a feature extracted from the text data. Therefore, the features of the text data may be extracted without any human input defining the features. The implementations described herein provide an efficient, scalable, and adjustable technique for converting text data included in complex and sophisticated software logs into numeric data while maintaining all features (e.g., meaningful information) of the text data. A machine learning model or an AI model may be trained using the high dimensional tensors (e.g., the embedding tensors) to obtain information associated with the software logs. For example, the machine learning model or an AI model may be trained to classify a software log or to find similar software logs based on the high dimensional tensors (e.g., the embedding tensors). As a result, meaningful information (e.g., a classification or a similarity analysis) may be obtained for a software log without requiring the information in the software log to be analyzed or interpreted (e.g., by a user or a device). This conserves significant time associated with analyzing the software logs. Additionally, this conserves computing resources, and/or networking resources, among other examples that would otherwise have been consumed in analyzing the software logs, making incorrect modifications to a network or system based on incorrectly analyzed software logs, and/or correcting the incorrect modifications to the network or system, among other examples. Further, once trained, the AI model may not require time consuming retraining each time the AI model is to be implemented. For example, via transfer learning, the AI model can be used and implemented on devices and/or systems with less computing and/or processing overhead.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
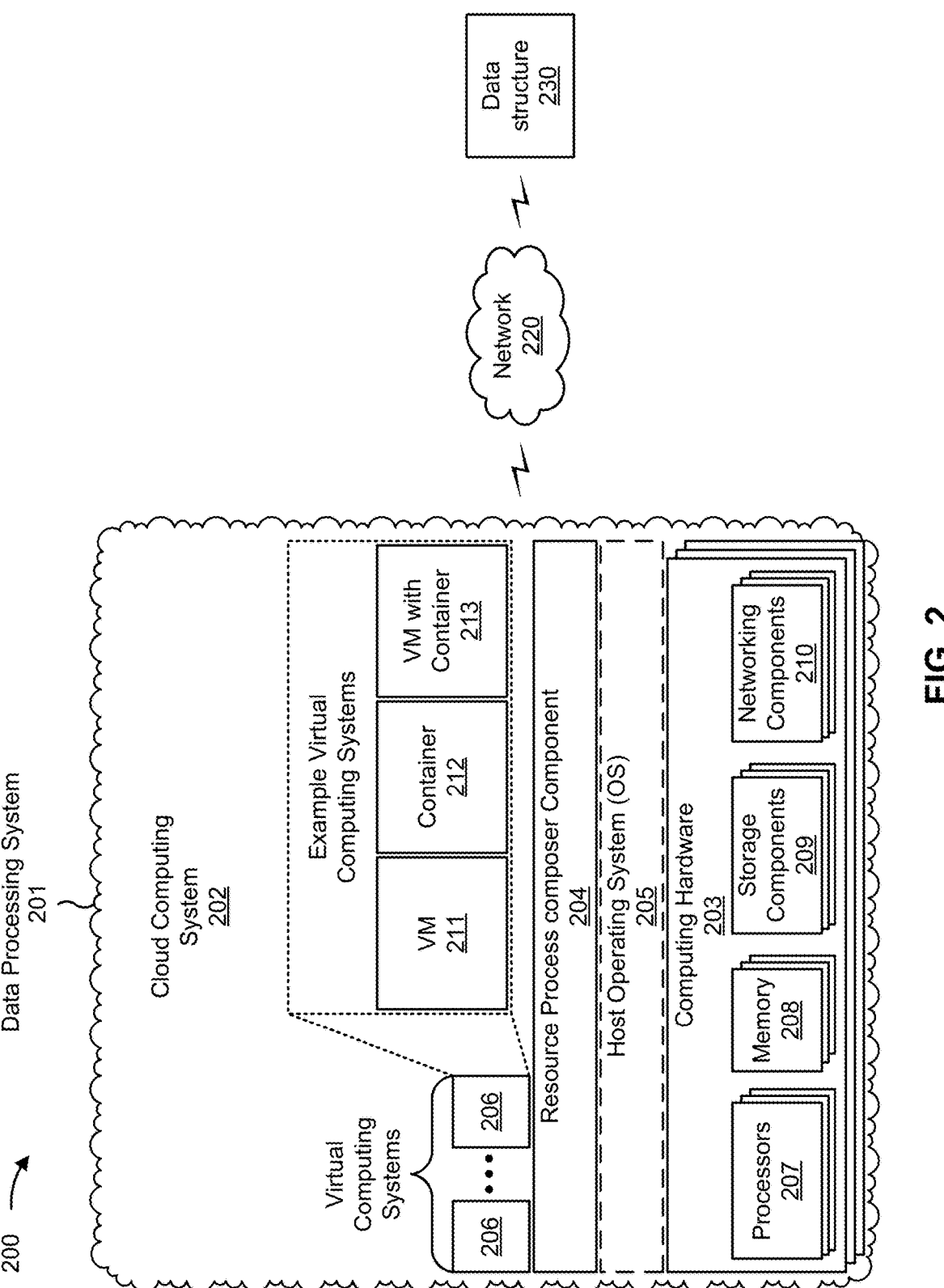
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a data processing system 201, which may include one or more elements of and/or may execute within a cloud computing system 202. The cloud computing system 202 may include one or more elements 203-213, as described in more detail below. As further shown in FIG. 2, the environment 200 may include a network 220 and/or a data structure 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a network-ing component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a con-tainer manager, such as when the virtual computing systems 206 are containers 212. In some implementations, the resource management component 204 executes within and/or in coordination with a host operating system 205.

A virtual computing system 206 includes a virtual envi-ronment that enables cloud-based execution of operations and/or processes described herein using computing hard-ware 203. As shown, the virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest oper-ating system (e.g., within the virtual computing system 206) or the host operating system 205.

Although the data processing system 201 may include one or more elements 203-213 of the cloud computing system 202, may execute within the cloud computing system 202, and/or may be hosted within the cloud computing system 202, in some implementations, the data processing system 201 may not be cloud-based (e.g., may be implemented outside of a cloud computing system) or may be partially cloud-based. For example, the data processing system 201 may include one or more devices that are not part of the cloud computing system 202, such as a device 300 of FIG. 3, which may include a standalone server or another type of computing device. The data processing system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The data structure 230 includes one or more devices capable of receiving, generating, storing, processing, and/or providing information, as described elsewhere herein. The data structure 230 may include a communication device and/or a computing device. For example, the data structure 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure

230 may communicate with one or more other devices of the environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
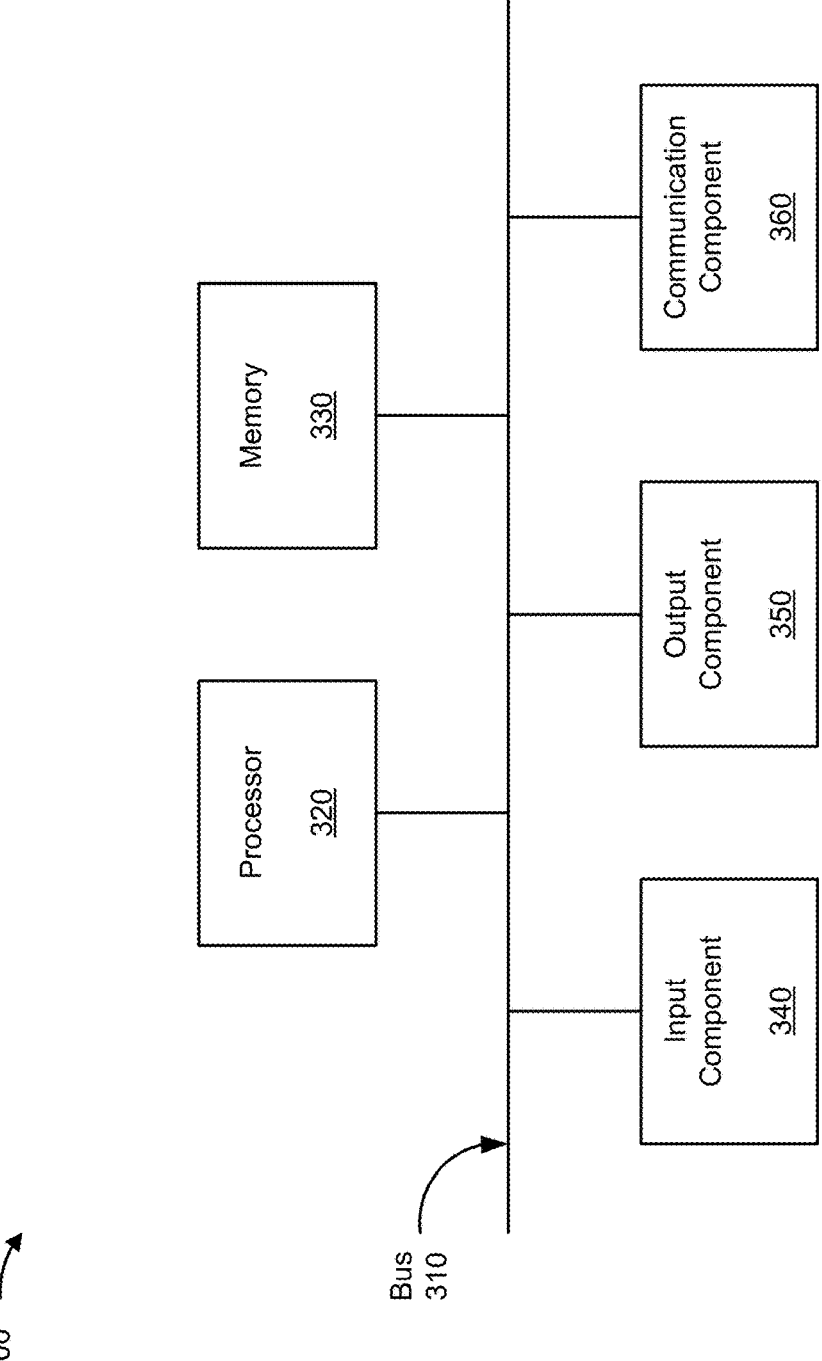
FIG. 3 is a diagram of example components of one or more devices of FIG. 2.

FIG. 3 is a diagram of example components of a device 300, which may correspond to the data processing system 201 and/or the data structure 230. In some implementations, the data processing system 201 and/or the data structure 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the compo-nents of device 300. Bus 310 may couple together two or more components of FIG. 3, such as via operative coupling, communicative coupling, electronic coupling, and/or elec-tric coupling. Processor 320 includes a central processing unit, a graphics processing unit, a microprocessor, a con-troller, a microcontroller, a digital signal processor, a field-programmable gate array, an application-specific integrated circuit, and/or another type of processing component. Pro-cessor 320 is implemented in hardware, firmware, or a combination of hardware and software. In some implemen-tations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or soft-ware (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with high dimensional dense tensor representation for log data. In some implementations, one or more process blocks of FIG. 4 are performed by a device (e.g., the data processing system 201). In some implementations, one or more process blocks of FIG. 4 are performed by another device or a group of devices separate from or including the device, such as a data structure (e.g., the data structure 230), among other examples. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include obtaining a training corpus from a set of concatenated pre-processed log data, wherein the training corpus is associated with an alphanumeric format (block 410). For example, the device may obtain a training corpus from a set of concatenated pre-processed log data, wherein the training corpus is associated with an alphanumeric format, as described above.

As further shown in FIG. 4, process 400 may include encoding the training corpus to obtain a set of encoded data using a set of vocabulary tokens that are based on alphanumeric characters included in the training corpus, wherein the encoded data is associated with a numeric format (block 420). For example, the device may encode the training corpus to obtain a set of encoded data using a set of vocabulary tokens that are based on alphanumeric characters included in the training corpus, wherein the encoded data is associated with a numeric format, as described above.

As further shown in FIG. 4, process 400 may include calculating a sequence length based on a statistical parameter associated with the training corpus (block 430). For example, the device may calculate a sequence length based on a statistical parameter associated with the training corpus, as described above.

As further shown in FIG. 4, process 400 may include generating a set of input sequences and a set of target sequences based on the set of encoded data, wherein each input sequence, from the set of input sequences, and each target sequence, from the set of target sequences, has a length equal to the sequence length, and wherein the set of target sequences are shifted versions of the set of input sequences (block 440). For example, the device may generate a set of input sequences and a set of target sequences based on the set of encoded data, wherein each input sequence, from the set of input sequences, and each target sequence, from the set of target sequences, has a length equal to the sequence length, and wherein the set of target sequences are shifted versions of the set of input sequences, as described above.

As further shown in FIG. 4, process 400 may include generating a training data set based on combining the set of input sequences and the set of target sequences into a tuple, partitioning the tuple into batches based on a batch size, and shuffling information included in the batches to obtain the training data set (block 450). For example, the device may generate a training data set based on combining the set of input sequences and the set of target sequences into a tuple, partitioning the tuple into batches based on a batch size, and shuffling information included in the batches to obtain the training data set, as described above.

As further shown in FIG. 4, process 400 may include training a sequential deep neural network using the training data set and based on one or more hyperparameters to obtain a set of embedding tensors associated with an embedding layer of the sequential deep neural network (block 460). For example, the device may train a sequential deep neural network using the training data set and based on one or more hyperparameters to obtain a set of embedding tensors associated with an embedding layer of the sequential deep neural network, as described above.

As further shown in FIG. 4, process 400 may include performing an artificial intelligence operation using the set of embedding tensors to obtain information associated with log data associated with the set of concatenated pre-processed log data (block 470). For example, the device may perform an artificial intelligence operation using the set of embedding tensors to obtain information associated with log data associated with the set of concatenated pre-processed log data, as described above.

Process 400 may include additional implementations, such as any single implementation or any combination of implementations described below and/or in connection with one or more other processes described elsewhere herein.

In a first implementation, process 400 includes detecting one or more outlier data sets from pre-processed log data associated with the set of concatenated pre-processed log data, removing the one or more outlier data sets from the pre-processed log data, and concatenating the pre-processed log data, with the one or more outlier data sets removed, to obtain the set of concatenated pre-processed log data.

In a second implementation, alone or in combination with the first implementation, the set of vocabulary tokens are based on unique characters included in the alphanumeric characters that are included in the training corpus.

In a third implementation, alone or in combination with one or more of the first and second implementations, calculating the sequence length comprises detecting a set of data blocks from the training corpus based on one or more indicators included in the alphanumeric characters included in the training corpus, determining a size of each data block included in the set of data blocks, removing any data blocks, from the set of data blocks, that are associated with an outlier length, and calculating the statistical parameter based on sizes of data blocks included in the set of data blocks to obtain the sequence length.

In a fourth implementation, alone or in combination with one or more of the first through third implementations, the statistical parameter is an average of the sizes of data blocks included in the set of data blocks.

In a fifth implementation, alone or in combination with one or more of the first through fourth implementations, process 400 includes detecting one or more outlier encoded data blocks from the set of encoded data based on a size of the one or more outlier encoded data blocks, and removing the one or more outlier encoded data blocks from the set of encoded data.

In a sixth implementation, alone or in combination with one or more of the first through fifth implementations, the one or more hyperparameters include at least one of a quantity of epochs, a size associated with the set of vocabulary tokens, the batch size, an embedding dimension size, or a quantity of neurons associated with a recurrent neural network layer of the sequential deep neural network.

In a seventh implementation, alone or in combination with one or more of the first through sixth implementations, performing the artificial intelligence operation comprises classifying, using an artificial intelligence model that is trained based on the set of embedding tensors, the log data into one or more categories from a set of candidate categories.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

obtaining, by a device, a training corpus from a set of concatenated pre-processed log data, wherein the training corpus is associated with an alphanumeric format;

encoding, by the device, the training corpus to obtain a set of encoded data using a set of vocabulary tokens that are based on alphanumeric characters included in the training corpus, wherein the encoded data is associated with a numeric format;

detecting, by the device, a set of data blocks from the training corpus based on a plurality of indicators included in the alphanumeric characters included in the training corpus, wherein the plurality of indicators indicate breaks or partitions between portions of the training corpus, and wherein each data block, of the set of data blocks, corresponds to a set of alphanumeric characters included between two indicators, of the plurality of indicators;

calculating, by the device, a statistical parameter associated with the training corpus based on sizes of data blocks included in the set of data blocks;

calculating, by the device, a sequence length based on the statistical parameter associated with the training corpus;

generating, by the device, a set of input sequences and a set of target sequences based on the set of encoded data, wherein each input sequence, from the set of input sequences, and each target sequence, from the set of target sequences, has a length equal to the sequence length, and wherein the set of target sequences are shifted versions of the set of input sequences;

generating, by the device, a training data set based on combining the set of input sequences and the set of target sequences into a tuple, partitioning the tuple into batches based on a batch size, and shuffling information included in the batches to obtain the training data set;

training, by the device, a sequential deep neural network using the training data set and based on one or more hyperparameters to obtain a set of embedding tensors associated with an embedding layer of the sequential deep neural network; and

performing, by the device, an artificial intelligence operation using the set of embedding tensors to obtain information associated with log data associated with the set of concatenated pre-processed log data.

2. The method of claim 1, further comprising:

detecting one or more outlier data sets from pre-processed log data associated with the set of concatenated pre-processed log data, wherein the one or more outlier data sets are detected based on a quantity of lines associated with the one or more outlier data sets;

removing the one or more outlier data sets from the pre-processed log data; and concatenating the pre-processed log data, with the one or more outlier data sets removed, to obtain the set of concatenated pre-processed log data.

3. The method of claim 1, wherein the set of vocabulary tokens are based on unique characters included in the alphanumeric characters that are included in the training corpus.

4. The method of claim 1, wherein the plurality of indicators include a plurality of command indicators, and wherein calculating the sequence length comprises:

determining a size of each data block included in the set of data blocks;

removing any data blocks, from the set of data blocks, for which the determined size is outside a range of sizes; and calculating the statistical parameter based on sizes of data blocks included in the set of data blocks to obtain the sequence length.

5. The method of claim 4, wherein the statistical parameter is an average of the sizes of data blocks included in the set of data blocks.

6. The method of claim 1, further comprising:

detecting one or more outlier encoded data blocks from the set of encoded data based on a size of the one or more outlier encoded data blocks; and removing the one or more outlier encoded data blocks from the set of encoded data.

7. The method of claim 1, wherein the one or more hyperparameters include at least one of:

a quantity of epochs, a size associated with the set of vocabulary tokens, an embedding dimension size, or a quantity of neurons associated with a recurrent neural network layer of the sequential deep neural network.

8. The method of claim 1, wherein performing the artificial intelligence operation comprises:

classifying, using an artificial intelligence model that is trained based on the set of embedding tensors, the set of concatenated pre-processed log data into one or more categories from a set of candidate categories.

9. A device, comprising:

one or more memories; and one or more processors, coupled to the one or more memories, configured to:

obtain a training corpus from a set of log data, wherein the training corpus includes alphanumeric characters;

encode the training corpus to obtain a set of encoded data using vocabulary tokens that are based on unique characters included in the alphanumeric characters of the training corpus, wherein the set of encoded data is associated with a numeric format;

detect a set of data blocks from the training corpus based on a plurality of indicators included in the alphanumeric characters included in the training corpus, wherein the plurality of indicators indicate breaks or partitions between portions of the training corpus, and wherein each data block, of the set of data blocks, corresponds to a set of alphanumeric characters included between two indicators, of the plurality of indicators;

calculate a statistical parameter associated with the training corpus based on sizes of data blocks included in the set of data blocks;

calculate a sequence length based on the statistical parameter associated with the training corpus;

generate a set of input sequences and a set of target sequences based on the set of encoded data, wherein each input sequence, from the set of input sequences, and each target sequence, from the set of target sequences, has a length equal to the sequence length;

generate a training data set based on combining the set of input sequences and the set of target sequences, and shuffling data included in the combined set of input sequences and set of target sequences to obtain the training data set;

train a deep neural network using the training data set and based on one or more hyperparameters to obtain a set of embedding tensors associated with an embedding layer of the deep neural network, wherein the deep neural network includes the embedding layer, a recurrent neural network layer, and a dense neural network layer; and perform an artificial intelligence operation using the set of embedding tensors to obtain information associated with the set of log data.

10. The device of claim 9, wherein the one or more processors are further configured to:

detect one or more outlier data sets from the set of log data based on a size of the one or more outlier data sets; and remove the one or more outlier data sets from the set of log data.

11. The device of claim 9, wherein the one or more processors, to generate the set of input sequences and the set of target sequences, are configured to:

generate the set of input sequences based on partitioning the set of encoded data into sequences having the sequence length; and apply a window shift, based on a shift value, to the set of input sequences to generate the set of target sequences.

12. The device of claim 9, wherein the plurality of indicators include a plurality of command indicators, and wherein the one or more processors, to calculate the sequence length, are configured to:

determine a size of each data block included in the set of data blocks;

remove any data blocks, from the set of data blocks, that for which the determined size is outside a range of sizes; and calculate the statistical parameter based on sizes of data blocks included in the set of data blocks to obtain the sequence length.

13. The device of claim 9, wherein the embedding layer is a first layer of the deep neural network, the recurrent neural network layer is a second layer of the deep neural network, and the dense neural network layer is a third layer of the deep neural network, and wherein the recurrent neural network layer includes at least one of a long short-term memory recurrent neural network layer or a gated recurrent unit recurrent neural network layer.

14. The device of claim 9, wherein the one or more processors are further configured to:

receive an indication of respective values for the one or more hyperparameters, wherein the one or more hyperparameters include at least one of:

a quantity of epochs associated with training the deep neural network, a size associated with the vocabulary tokens, an embedding dimension size associated with the embedding layer, or a quantity of neurons associated with the recurrent neural network layer.

15. The device of claim 9, wherein the one or more processors, to perform the artificial intelligence operation, are configured to:

perform, using an artificial intelligence model that is trained based on using the set of embedding tensors as an input to the artificial intelligence model, at least one of:

a categorization of the set of log data, or a similarity analysis of the set of log data to one or more other sets of log data.

16. A non-transitory computer-readable medium storing a set of instructions, the set of instructions comprising:

one or more instructions that, when executed by one or more processors of a device, cause the device to:

detect one or more outlier data sets from pre-processed log data and remove the one or more outlier data sets from the pre-processed log data;

obtain a training corpus based on concatenating the pre-processed log data, wherein the training corpus includes alphanumeric characters;

encode the training corpus to obtain a set of encoded data using a set of vocabulary tokens that are based on unique characters included in the alphanumeric characters, wherein the encoded data is associated with a numeric format;

detect a set of data blocks from the training corpus based on a plurality of indicators included in the alphanumeric characters included in the training corpus, wherein the plurality of indicators indicate breaks or partitions between portions of the training corpus, and wherein each data block, of the set of data blocks, corresponds to a set of alphanumeric characters included between two indicators, of the plurality of indicators;

calculate a statistical parameter associated with the training corpus based on sizes of data blocks included in the set of data blocks;

calculate a sequence length based on the statistical parameter associated with the training corpus;

generate a set of input sequences and a set of target sequences based on the set of encoded data, wherein each input sequence, from the set of input sequences, and each target sequence, from the set of target sequences, have a length equal to the sequence length;

generate a training data set based on combining the set of input sequences and the set of target sequences into a tuple, partitioning the tuple into batches based on a batch size, and shuffling information included in the batches to obtain the training data set; and train a sequential deep neural network using the training data set and based on one or more hyperparameters to obtain a set of embedding tensors associated with an embedding layer of the sequential deep neural network, wherein the set of embedding tensors is a numerical representation of the pre-processed log data.

17. The non-transitory computer-readable medium of claim 16, wherein the one or more instructions further cause the device to:

perform an artificial intelligence operation using the set of embedding tensors to obtain information associated with the pre-processed log data.

18. The non-transitory computer-readable medium of claim 16, wherein the plurality of indicators include a plurality of command indicators, and wherein the one or more instructions, that cause the device to calculate the sequence length, cause the device to:

determine a size of each data block included in the set of data blocks; and calculate the statistical parameter based on sizes of data blocks included in the set of data blocks to obtain the sequence length.

19. The non-transitory computer-readable medium of claim 16, wherein the sequential deep neural network includes the embedding layer as a first layer, a recurrent neural network layer as a second layer, and a dense neural network layer as a third layer, and wherein the embedding layer is associated with input hyperparameters, from the one or more hyperparameters, including a size associated with the set of vocabulary tokens, the batch size, and an embedding dimension size.

20. The non-transitory computer-readable medium of claim 19, wherein the recurrent neural network layer is associated with input hyperparameters, from the one or more hyperparameters, including a quantity of neurons or hidden units, and a recurrent initializer, and wherein the dense neural network layer is associated with input hyperparameters, from the one or more hyperparameters, including the size associated with the set of vocabulary tokens.

* * * * *